(12) United States Patent
Agah et al.

(10) Patent No.: US 11,716,110 B2
(45) Date of Patent: Aug. 1, 2023

(54) COMPACT RADIO FREQUENCY COMBINER

(71) Applicant: Space Exploration Technologies Corp., Hawthorne, CA (US)

(72) Inventors: Amir Agah, Kirkland, WA (US); Eric Pepin, Seattle, WA (US); Kim W. Schulze, Seattle, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

(21) Appl. No.: 17/703,766

(22) Filed: Mar. 24, 2022

(65) Prior Publication Data
US 2022/0311467 A1    Sep. 29, 2022

Related U.S. Application Data

(60) Provisional application No. 63/167,578, filed on Mar. 29, 2021.

(51) Int. Cl.
*H04B 1/3805* (2015.01)
*H04B 1/10* (2006.01)
*H04B 1/00* (2006.01)

(52) U.S. Cl.
CPC ........... *H04B 1/3805* (2013.01); *H04B 1/006* (2013.01); *H04B 1/1081* (2013.01); *H04B 2001/3811* (2013.01)

(58) Field of Classification Search
CPC .................................................. H04B 1/3805
See application file for complete search history.

(56) References Cited

U.S. PATENT DOCUMENTS

| | | | |
|---|---|---|---|
| 10,165,513 B1* | 12/2018 | Gorbachov | H04B 1/48 |
| 2014/0043203 A1* | 2/2014 | Sabouri | H01Q 9/14 343/860 |
| 2014/0266500 A1* | 9/2014 | Papamichail | H01P 1/10 333/32 |
| 2019/0190560 A1* | 6/2019 | Reja | H04B 1/40 |

* cited by examiner

*Primary Examiner* — Hsinchun Liao
(74) *Attorney, Agent, or Firm* — Polsinelli PC

(57) ABSTRACT

Technologies for provided for a radio frequency input/output (RFIO) combiner/splitter. An example combiner/splitter can include an RFIO circuit including a receive path including first and second low noise amplifiers (LNAs), first switches, resistors, and capacitors, each of the first switches being in series with a respective one of the first capacitors and first resistors; a transmit path including a first power amplifier (PA) including second switches coupled to second resistors and third switches coupled to third resistors, and a second PA including fourth switches coupled to fourth resistors and fifth switches coupled to fifth resistors, each of the second switches, the third switches, the fourth switches, and the fifth switches being in series with one or more respective ones of the second resistors, the third resistors, the fourth resistors, and the fifth resistors; and a balun that couples the Rx and Tx path to an RFIO terminal.

20 Claims, 13 Drawing Sheets

COMPACT RADIO FREQUENCY COMBINER

CROSS-REFERENCE TO RELATED APPLICATIONS

This application claims priority to U.S. Provisional Application No. 63/167,578, filed on Mar. 29, 2021, entitled "COMPACT RADIO FREQUENCY COMBINER", the contents of which are incorporated herein in their entirety and for all purposes.

TECHNICAL FIELD

The present disclosure generally relates to wireless communications and, more specifically, a compact radio frequency combiner for wireless communication systems.

BACKGROUND

Phased array antennas are used in a variety of wireless communication systems such as satellite and cellular communication systems. The phased array antennas can include a number of antenna elements arranged to behave as a larger directional antenna. Moreover, a phased array antenna can be used to increase an overall directivity and gain, steer the angle of array for greater gain and directivity, perform interference cancellation from one or more directions, determine the direction of arrival of received signals, and improve a signal to interference ratio, among other things. Advantageously, a phased array antenna can be configured to implement beamforming techniques to transmit and/or receive signals in a preferred direction without physically repositioning or reorientation.

In some cases, a phased array antenna can implement time-division duplexing (TDD) to separate uplink and downlink communications using time-division multiplexing. With TDD, the phased array antenna can allocate different time slots in a same frequency band to the uplink and downlink communications. Accordingly, TDD can emulate full duplex communication over a half-duplex communication link. TDD circuits can implement radio frequency (RF) switches to switch between receive (Rx) and transmit (Tx) modes. However, the RF switches are based on expensive complementary metal-oxide-semiconductor (CMOS) technologies. Therefore, TDD circuits can be expensive and generally incompatible with lower cost technologies, such as lower cost circuitry and/or components.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1A:
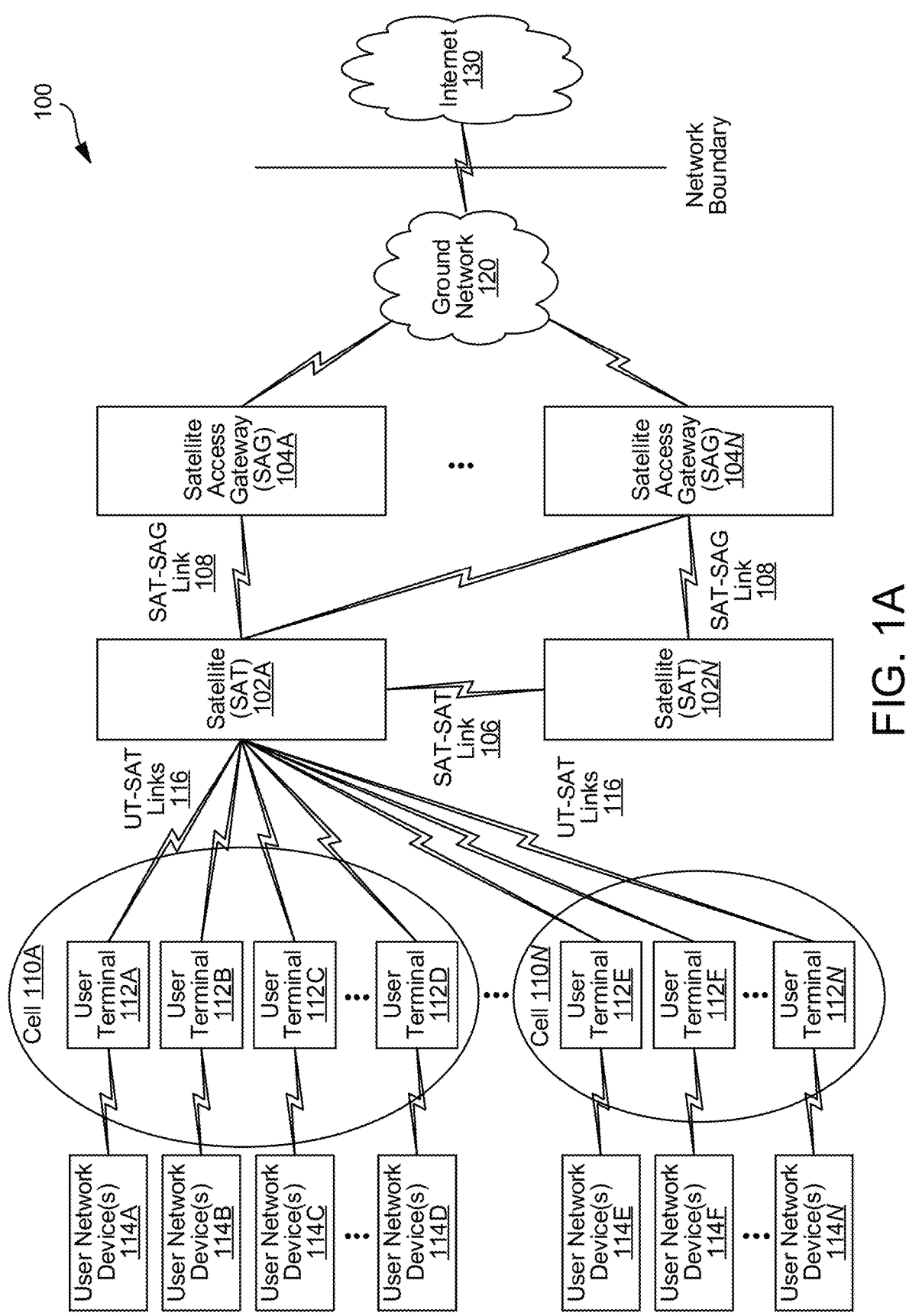
FIG. 1A is a simplified diagram illustrating an example wireless communication system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously mentioned, time-division duplexing (TDD) can be implemented by wireless communication systems, such as phased array antennas, to separate uplink and downlink communications using time-division multiplexing. With TDD, a wireless communication system can allocate different time slots in a same frequency band to the uplink and downlink communications. Accordingly, TDD can emulate full duplex communication over a half-duplex communication link. TDD circuits can implement radio frequency (RF) switches to switch between receive (Rx) and transmit (Tx) modes. However, the RF switches are based on expensive complementary metal-oxide-semiconductor (CMOS) technologies. Therefore, TDD circuits can be expensive and generally incompatible with lower cost technologies, such as lower cost circuitry and/or components.

In some cases, a wireless communication system implementing TDD can use a wideband frontend (FE) to operate an antenna in both receive and transmit modes. To this end, the FE can implement a combining/splitting network. Generally, such FEs use advanced CMOS technologies that enable the FEs to use switches with low on resistance for the combiner/splitter network. However the CMOS technologies (as well as the FE and combining/splitting network) are expensive, making them unpractical, unfeasible, and/or costly for various applications such as, for example, phased array antennas.

In some aspects, systems, apparatuses, processes (also referred to as methods), and computer-readable media (collectively referred to herein as "systems and techniques") are described herein for low cost TDD receive and transmit circuits, such as Rx and Tx FEs implemented by wireless communication systems. In some examples, a TDD receive and transmit circuit can include a radio frequency input/output (RFIO) circuit that can switch between receive and transmit modes with lower cost technologies (e.g., circuitry, components, etc.). For example, the TDD receive and transmit circuit can include a wideband FE with an RFIO circuit that enables switching between receive and transmit modes without more expensive and/or higher performance circuitry, such as RF switches.

In some examples, the RFIO circuit can include a wideband compact matching network for a low cost TDD receive and transmit frontend of a wireless communication system, such as a phased array antenna system. The tunable matching network can use a switch that is in series with the bias resistance, which can allow the tunable matching network to be implemented without more expensive switching technologies, such as radio frequency (RF) switches which implement high cost CMOS technologies. The matching network is thus compatible with low cost technologies.

In some examples, the RFIO circuit can include a 1 input, 4 output wideband matching network that is implemented with a balun and a small number of lower quality and/or cost switches that are in series with resistors. In some cases, the RFIO circuit can include a 3 turn balun that couples the transmit (Tx) and receive (Rx) paths of the RFIO circuit to an RFIO terminal (e.g., RFIO input). The 3 turn balun can include a turn connected to the RFIO terminal, a turn connected to the Rx path, and a turn connected to the Tx path. In some cases, the Rx path can include a set of low noise amplifiers (LNAs), and the Tx path can include a set of power amplifiers (PAs). In some examples, the LNAs in the Rx path can include differential LNAs, and PAs in the Tx path can include differential or pseudo differential PAs.

In a Tx mode, Rx switches in the RFIO circuit can be opened, and Tx switches in the RFIO can be closed. As a result, the power delivered to the RFIO circuit can be transferred to the PAs in the Tx path. In an Rx mode, the Rx switches in the RFIO circuit can be closed, and the Tx switches in the RFIO circuit can be opened. As a result, the power delivered to the RFIO circuit can be transferred to the LNAs in the Rx path.

The Tx switches allow the matching network to switch between Rx and Tx modes without high frequency RF switches. In some examples, at least some of the Tx switches can be in series with resistors (and/or bias resistance) in the RFIO circuit. As further described herein, the on resistance of the Tx switches can be significantly relaxed, which can enable the RFIO circuit to be implemented on low cost technologies, such as lower cost CMOS technologies. Moreover, in some cases, the Rx switches in the RFIO circuit can be in series with a resistor. This can ensure that, in both Rx and Tx modes, the disclosed technologies can operate without a low on resistance switch.

In some cases, the RFIO circuit and/or the techniques disclosed herein can be used to implement TDD at a lower cost. In some cases, the RFIO circuit and/or the techniques disclosed herein can also be used to perform power splitting between multiple and/or separate systems with different frequencies of operation. For example, the RFIO circuit and/or the techniques disclosed herein can be implemented by an FE of a wireless device, such as a smartphone, on to select which antenna from multiple antennas will receive the input signal.

Figure 5:
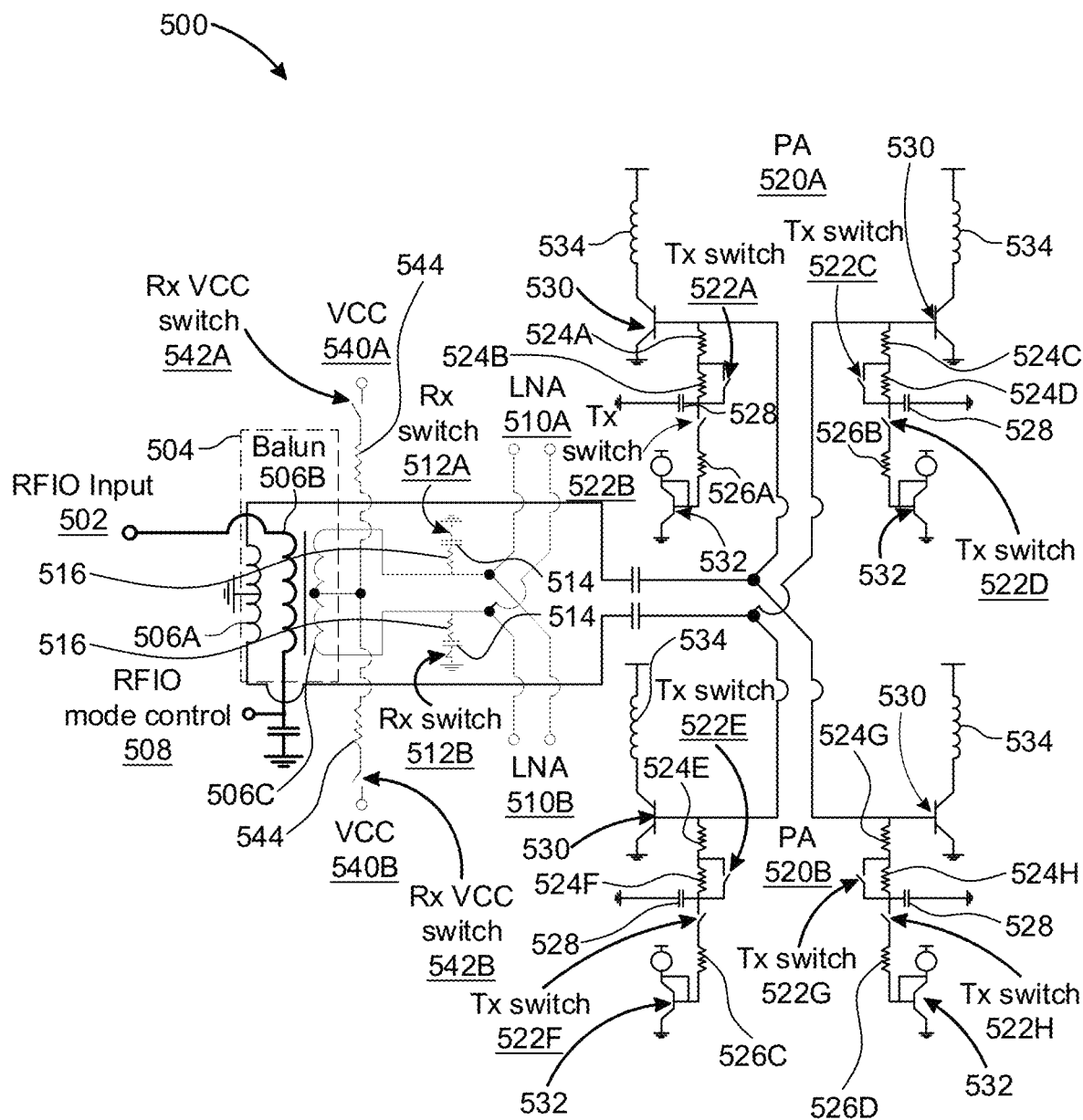
FIG. 5 is a schematic diagram illustrating an example radio frequency input/output (RFIO) circuit for lower cost time-division duplexing, in accordance with some examples of the present disclosure.
Figure 6:
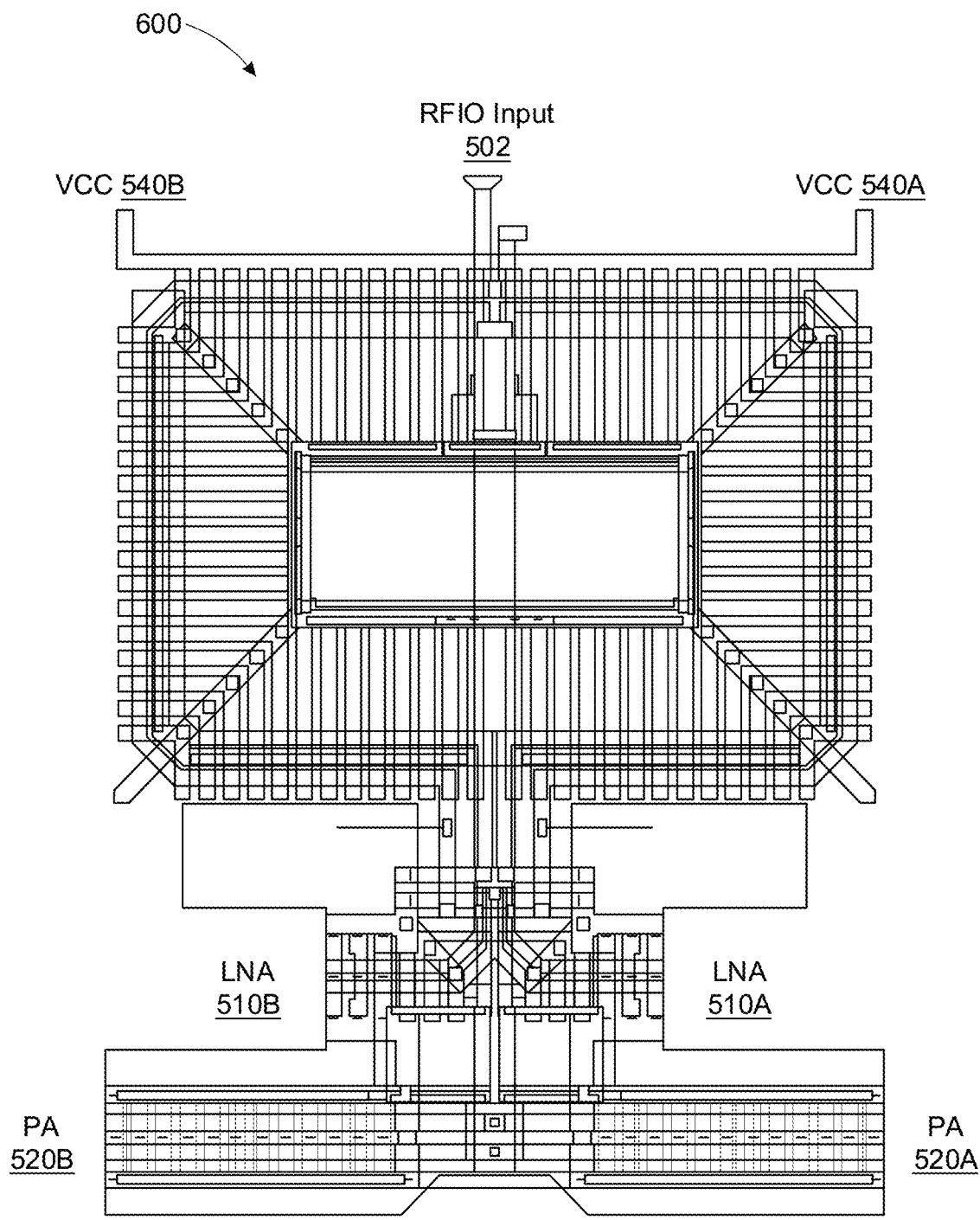
FIG. 6 is a diagram illustrating an example circuit layout of an example RFIO circuit, in accordance with some examples of the present disclosure.
Figure 7:
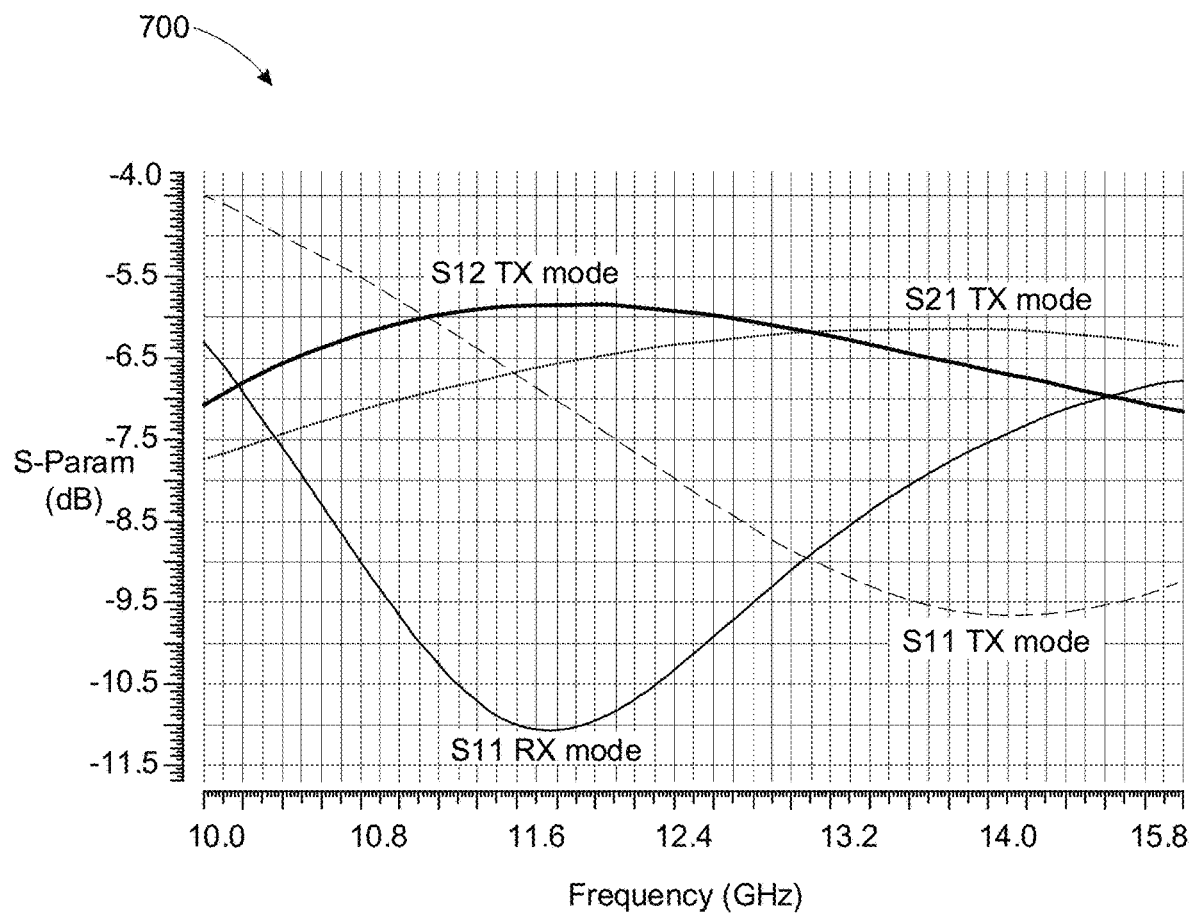
FIG. 7 is a graph illustrating an example frequency response of an example RFIO network, in accordance with some examples of the present disclosure.
Figure 8:
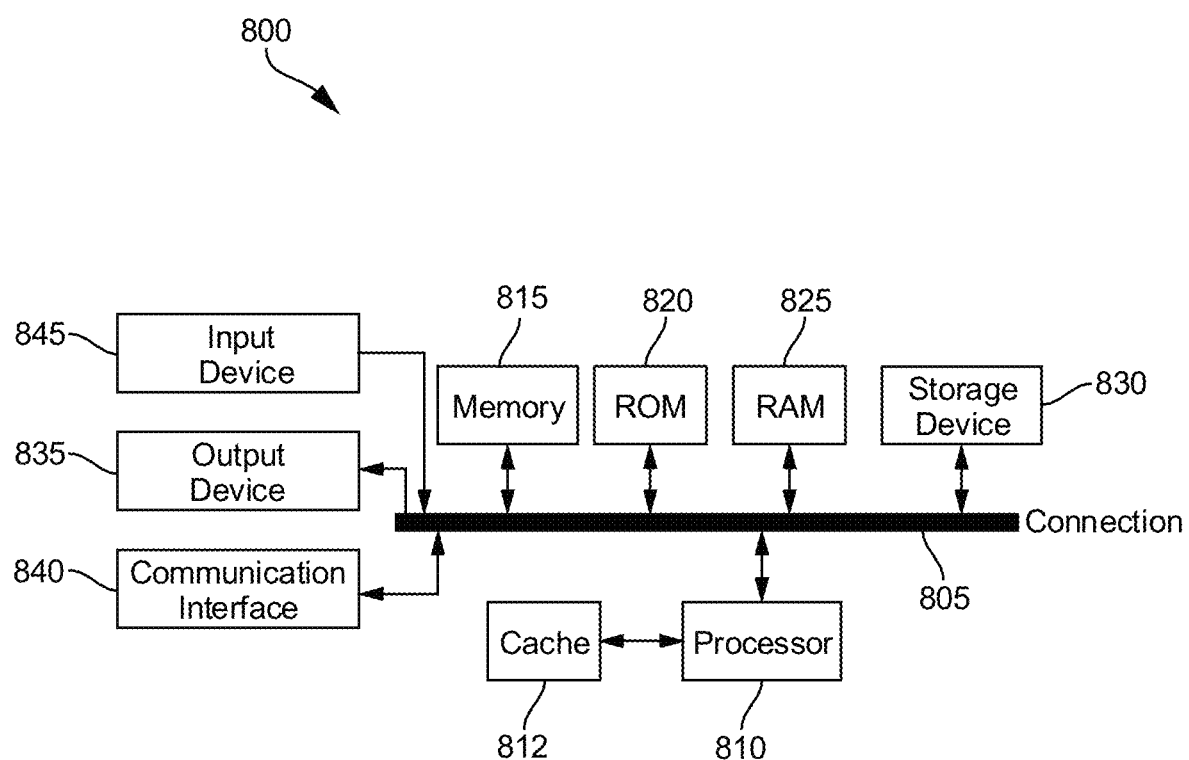
FIG. 8 is a diagram illustrating an example computing device architecture, in accordance with some examples of the present disclosure.

The disclosed systems and techniques will be described in the following disclosure as follows. The discussion begins with a description of example systems and technologies for wireless communications and example phased array antennas and circuits, as illustrated in FIGS. 1A through 4C. A description of example RFIO circuits that can be implemented in phased array antennas and other electronic systems, as illustrated in FIGS. 5 through 7, will then follow. The discussion concludes with a description of an example computing device architecture including example hardware components that can be implemented with phased array antennas and other electronic systems, as illustrated in FIG. 8. The disclosure now turns to FIG. 1A.

FIG. 1A is a block diagram illustrating an example wireless communication system 100, in accordance with some examples of the present disclosure. In this example, the wireless communication system 100 is a satellite-based communication system and includes one or more satellites (SATs) 102A-102N (collectively "102"), one or more satellite access gateways (SAGs) 104A-104N (collectively "104"), user terminals (UTs) 112A-112N (collectively "112"), user network devices 114A-114N (collectively "114"), and a ground network 120 in communication with a network 130, such as the Internet.

The SATs 102 can include orbital communications satellites capable of communicating with other wireless devices or networks (e.g., 104, 112, 114, 120, 130) via radio telecommunications signals. The SATs 102 can provide communication channels, such as radio frequency (RF) links (e.g., 106, 108, 116), between the SATs 102 and other wireless devices located at different locations on Earth and/or in orbit. In some examples, the SATs 102 can establish communication channels for Internet, radio, television, telephone, radio, military, and/or other applications.

The user terminals 112 can include any electronic devices and/or physical equipment that support RF communications to and from the SATs 102. The SAGs 104 can include gateways or earth stations that support RF communications to and from the SATs 102. The user terminals 112 and the SAGs 104 can include antennas for wirelessly communicating with the SATs 102. The user terminals 112 and the SAGs 104 can also include satellite modems for modulating and demodulating radio waves used to communicate with the SATs 102. In some examples, the user terminals 112 and/or the SAGs 104 can include one or more server computers, routers, ground receivers, earth stations, user equipment, antenna systems, communication nodes, base stations, access points, and/or any other suitable device or equipment. In some cases, the user terminals 112 and/or the SAGS 104 can perform phased-array beamforming and digital processing to support highly directive, steered antenna beams that track the SATs 102. Moreover, the user terminals 112 and/or the SAGs 104 can use one or more frequency bands to communicate with the SATs 102, such as the Ku and/or Ka frequency bands.

The user terminals 112 can be used to connect the user network devices 114 to the SATs 102 and ultimately the Internet 130. The SAGS 104 can be used to connect the ground network 120 and the Internet 130 to the SATs 102. For example, the SAGs 104 can relay communications from the ground network 120 and/or the Internet 130 to the SATs 102, and communications from the SATs 102 (e.g., communications originating from the user network devices 114, the user terminals 112, or the SATs 102) to the ground network 120 and/or the Internet 130.

The user network devices 114 can include any electronic devices with networking capabilities and/or any combination of electronic devices such as a computer network. For example, the user network devices 114 can include routers, network modems, switches, access points, smart phones, laptop computers, servers, tablet computers, set-top boxes, Internet-of-Things (IoT) devices, smart wearable devices (e.g., head-mounted displays (HMDs), smart watches, etc.), gaming consoles, smart televisions, media streaming devices, autonomous vehicles or devices, user networks, etc. The ground network 120 can include one or more networks and/or data centers. For example, the ground network 120 can include a public cloud, a private cloud, a hybrid cloud, an enterprise network, a service provider network, an on-premises network, and/or any other network.

In some cases, the SATs 102 can establish communication links between the SATs 102 and the user terminals 112. For example, SAT 102A can establish communication links 116 between the SAT 102A and the user terminals 112A-D and/or 112E-N. The communication links 116 can provide communication channels between the SAT 102A and the user terminals 112A-D and/or 112E-N. In some examples, the user terminals 112 can be interconnected (e.g., via wired and/or wireless connections) with the user network devices 114.

Thus, the communication links between the SATs 102 and the user terminals 112 can enable communications between the user network devices 114 and the SATs 102. In some examples, each of the SATs 102A-N can serve user terminals 112 distributed across and/or located within one or more cells 110A-110N (collectively "110"). The cells 110 can represent geographic areas served and/or covered by the SATs 102. For example, each cell can represent an area corresponding to the satellite footprint of radio beams propagated by a SAT. In some cases, a SAT can cover a single cell. In other cases, a SAT can cover multiple cells. In some examples, a plurality of SATs 102 can be in operation simultaneously at any point in time (also referred to as a satellite constellation). Moreover, different SATs can serve different cells and sets of user terminals.

The SATs 102 can also establish communication links 106 with each other to support inter-satellite communications. Moreover, the SATs 102 can establish communication links 108 with the SAGs 104. In some cases, the communication links between the SATs 102 and the user terminals 112 and the communication links between the SATs 102 and the SAGs 104 can allow the SAGs 104 and the user terminals 112 to establish a communication channel between the user network devices 114, the ground network 120 and ultimately the Internet 130. For example, the user terminals 112A-D and/or 112E-N can connect the user network devices 114A-D and/or 114E-N to the SAT 102A through the communication links 116 between the SAT 102A and the user terminals 112A-D and/or 112E-N. The SAG 104A can connect the SAT 102A to the ground network 120, which can connect the SAGS 104A-N to the Internet 130. Thus, the communication links 108 and 116, the SAT 102A, the SAG 104A, the user terminals 112A-D and/or 112E-N and the ground network 120 can allow the user network devices 114A-D and/or 114E-N to connect to the Internet 130.

In some examples, a user can initiate an Internet connection and/or communication through a user network device from the user network devices 114. The user network device can have a network connection to a user terminal from the user terminals 112, which it can use to establish an uplink (UL) pathway to the Internet 130. The user terminal can wirelessly communicate with a particular SAT from the SATs 102, and the particular SAT can wirelessly communicate with a particular SAG from the SAGs 104. The particular SAG can be in communication (e.g., wired and/or wireless) with the ground network 120 and, by extension, the Internet 130. Thus, the particular SAG can enable the Internet connection and/or communication from the user network device to the ground network 120 and, by extension, the Internet 130.

In some cases, the particular SAT and SAG can be selected based on signal strength, line-of-sight, and the like. If a SAG is not immediately available to receive communications from the particular SAT, the particular SAG can be configured to communicate with another SAT. The second SAT can in turn continue the communication pathway to a particular SAG. Once data from the Internet 130 is obtained for the user network device, the communication pathway can be reversed using the same or different SAT and/or SAG as used in the UL pathway.

In some examples, the communication links (e.g., 106, 108, and 116) in the wireless communication system 100 can operate using orthogonal frequency division multiple access (OFDMA) via time domain and frequency domain multiplexing. OFDMA, also known as multicarrier modulation, transmits data over a bank of orthogonal subcarriers harmonically related by the fundamental carrier frequency. Moreover, in some cases, for computational efficiency, fast Fourier transforms (FFT) and inverse FFT can be used for modulation and demodulation.

While the wireless communication system 100 is shown to include certain elements and components, one of ordinary skill will appreciate that the wireless communication system 100 can include more or fewer elements and components than those shown in FIG. 1A. For example, the wireless communication system 100 can include, in some instances, networks, cellular towers, communication hops or pathways, network equipment, and/or other electronic devices that are not shown in FIG. 1A.

Figure 1B:
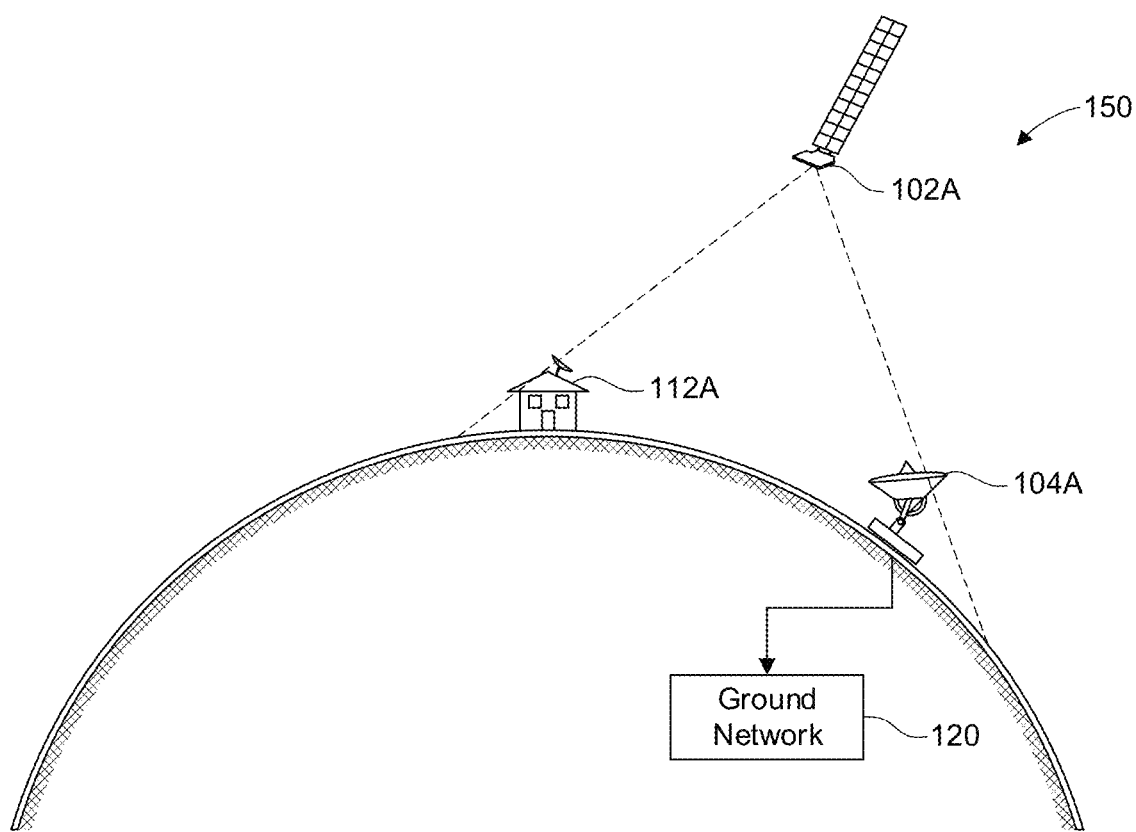
FIG. 1B is a simplified diagram illustrating an example of communication in a satellite communication system, in accordance with some examples of the present disclosure.

FIG. 1B is a diagram illustrating an example of an antenna and satellite communication system 150 in accordance with some examples of the present disclosure. As shown in FIG. 1B, an Earth-based UT 112A is installed at a location directly or indirectly on the Earth's surface such as a house, building, tower, vehicle, or another location where it is desired to obtain communication access via a network of satellites.

A communication path may be established between the UT 112A and SAT 102A. In the illustrated example, the SAT 102A, in turn, establishes a communication path with a SAG 104A. In another example, the SAT 102A may establish a communication path with another satellite prior to communication with SAG 104A. The SAG 104A may be physically connected via fiber optic, Ethernet, or another physical connection to a ground network 120. The ground network

120 may be any type of network, including the Internet. While one satellite is illustrated, communication may be with and between a constellation of satellites.

Figure 2A:
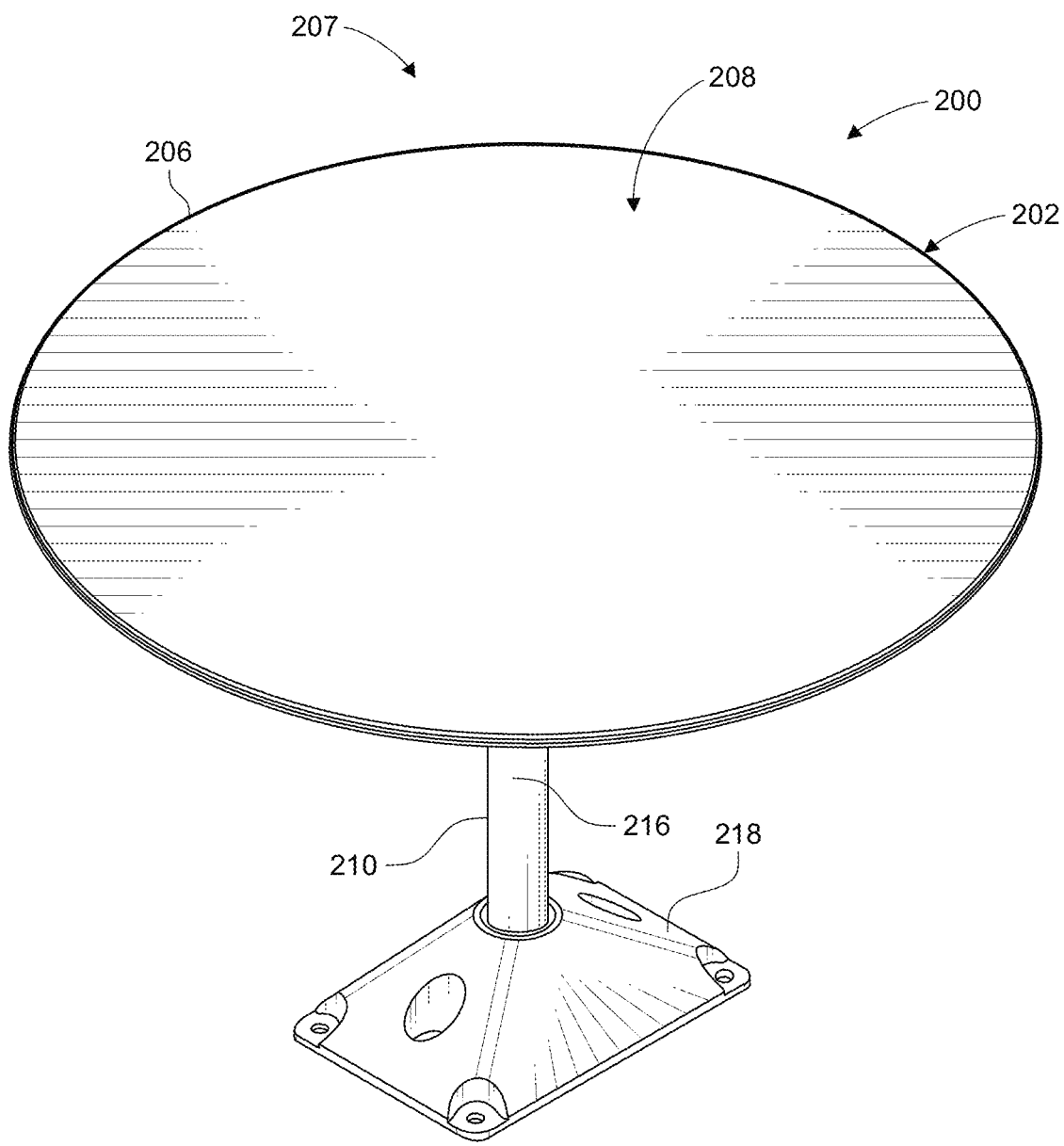
FIGS. 2A and 2B are isometric top and bottom views depicting an exemplary antenna apparatus, in accordance with some examples of the present disclosure.
Figure 2B:
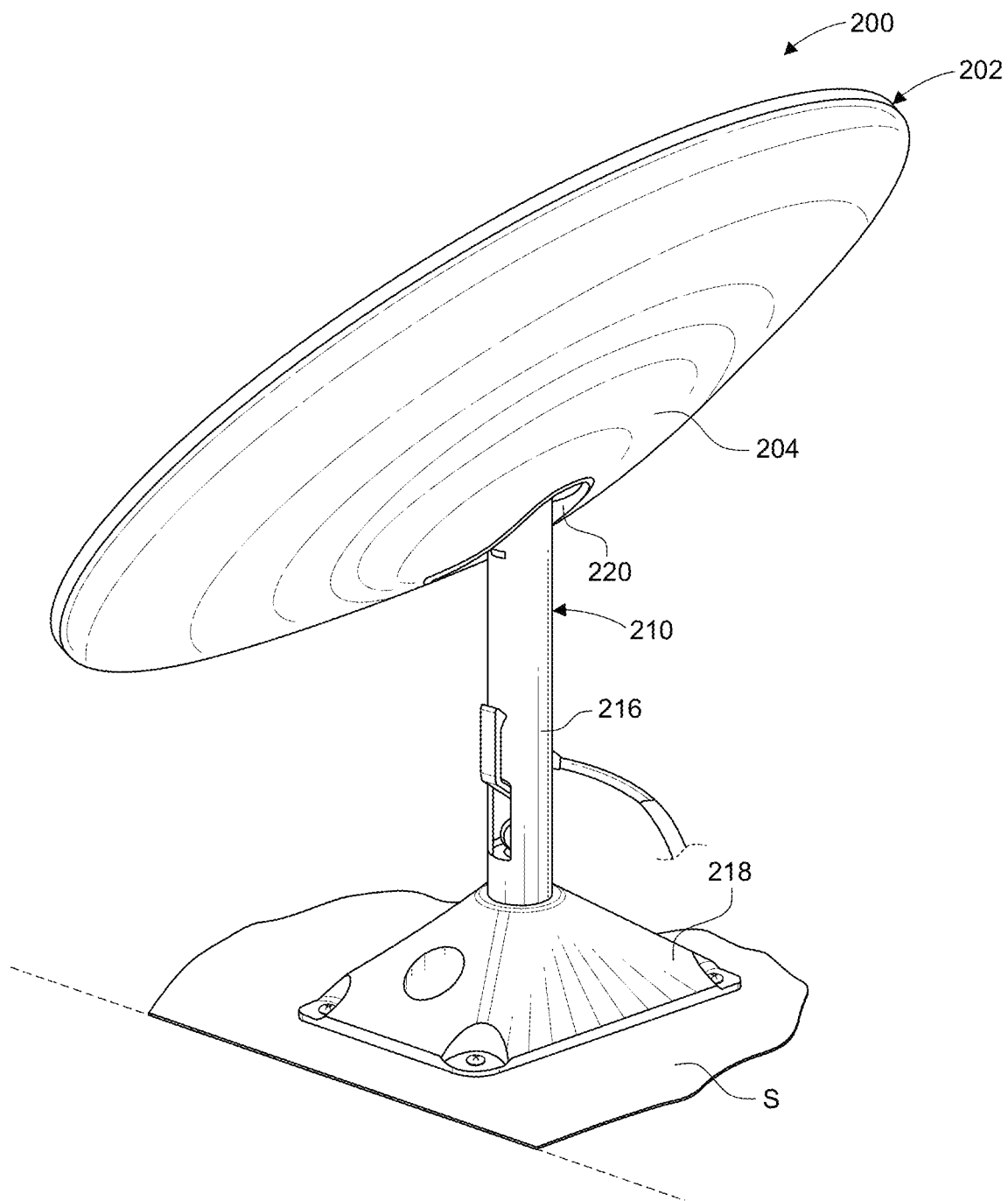

In some examples, the UT 112A may include an antenna system disposed in an antenna apparatus 200, for example, as illustrated in FIGS. 2A and 2B, designed for sending and/or receiving radio frequency signals to and/or from a satellite or a constellation of satellites. FIG. 2A illustrates an example top view of the antenna apparatus 200. The antenna apparatus 200 may include an antenna aperture 208 defining an area for transmitting and receiving signals, such as a phased array antenna system or another antenna system. The antenna apparatus 200 may include a top enclosure 207 that couples to a radome portion 206 to define a housing 202. The antenna apparatus 200 can also include a mounting system 210 having a leg 216 and a base 218.

FIG. 2B illustrates a perspective view of an underside of the antenna apparatus 200. As shown, the antenna apparatus 200 may include a lower enclosure 204 that couples to the radome portion 206 to define the housing 202. In the illustrated example, the mounting system 210 includes a leg 216 and a base 218. The base 218 may be securable to a surface S and configured to receive a bottom portion of the leg 216. A tilting mechanism 220 (details not shown) disposed within the lower enclosure 204 permits a degree of tilting to point the face of the radome portion 206 at a variety of angles for optimized communication and for rain and snow run-off.

Figure 3A:
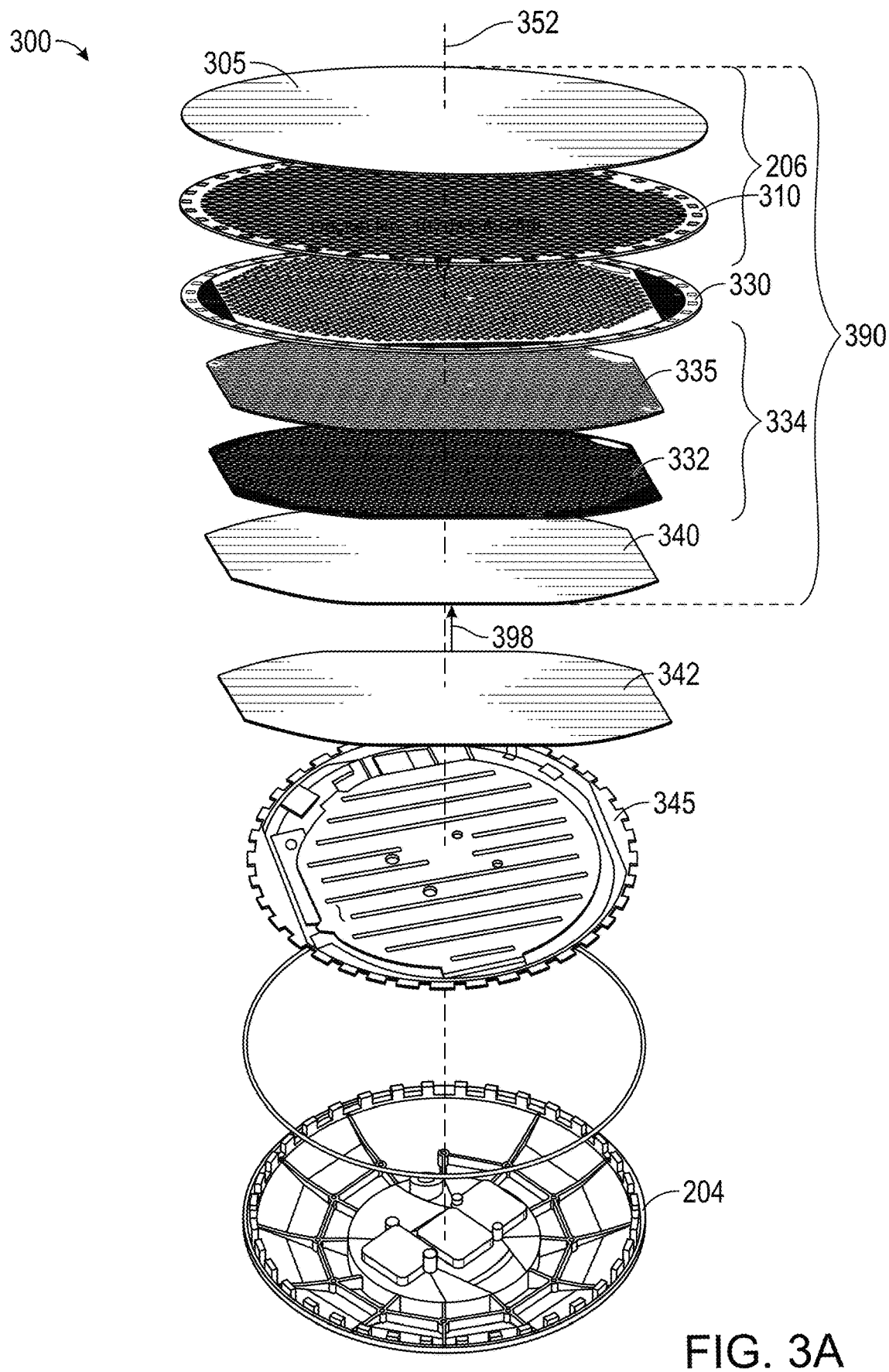
FIG. 3A is an isometric exploded view depicting an exemplary antenna apparatus including the housing and the antenna stack assembly, in accordance with some examples of the present disclosure.

Referring to FIG. 3A, an antenna stack assembly 300 can include a plurality of antenna components, which can include a printed circuit board (PCB) assembly 342 configured to couple to other electrical components disposed within the housing 202 (including lower enclosure 204 and radome portion 206). In the illustrated example, the antenna stack assembly 300 includes a phased array antenna assembly including a plurality of individual antenna elements configured in an array. The components of the phased array antenna assembly 334 may be mechanically and electrically supported by the PCB assembly 342.

Figure 3B:
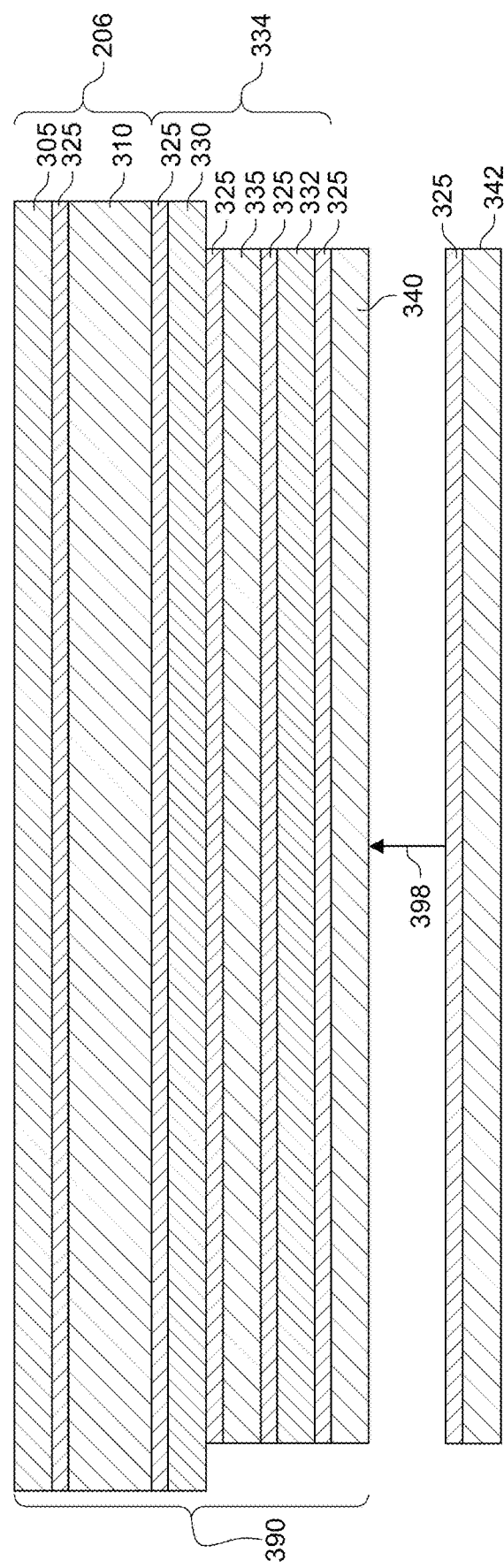
FIG. 3B is a cross-sectional view of an antenna stack assembly of an antenna apparatus, in accordance with some examples of the present disclosure.

In the illustrated example of FIGS. 3A and 3B, the layers in the antenna stack assembly 300 layup include a radome portion 206 (including radome 305 and radome spacer 310), a phased array antenna assembly 334 (including upper patch layer 330, lower patch layer 332, and antenna spacer 335 in between), a dielectric layer 340, and PCB assembly 342, as will be described in greater detail below. As seen in FIG. 3B, the layers may include adhesive coupling 325 between adjacent layers.

Figure 4A:
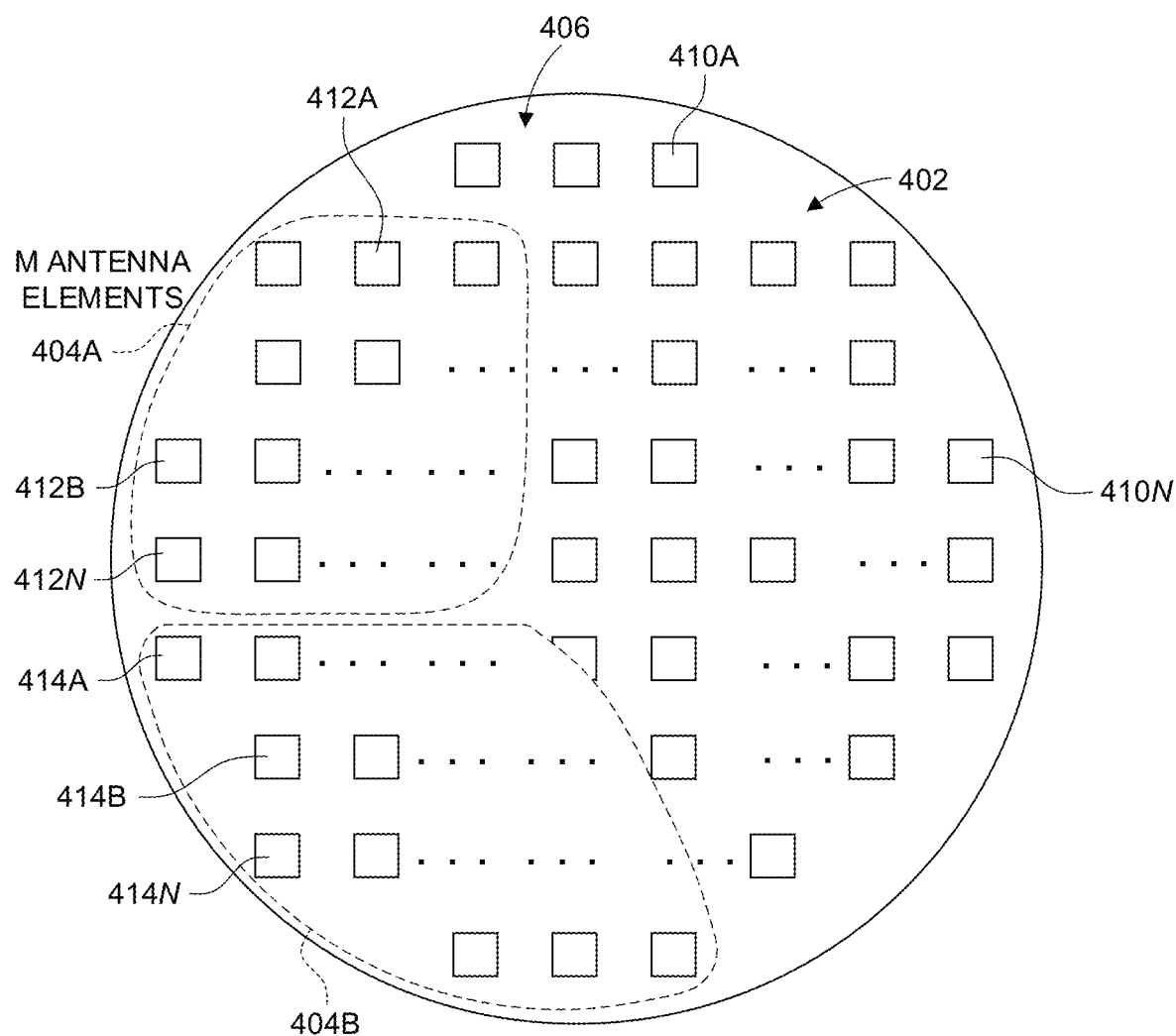
FIG. 4A is a diagram illustrating an example illustration of a top view of an antenna lattice, in accordance with some examples of the present disclosure.

FIG. 4A is a diagram illustrating an example top view of an antenna lattice 406, in accordance with some examples of the present disclosure. The antenna lattice 406 can be part of a phased array antenna system, as further described below with respect to FIGS. 4B and 4C. The antenna lattice 406 can include antenna elements 410A-N (collectively "410"), 412 A-N (collectively "412"), 414A-N (collectively "414") configured to transmit and/or send radio frequency signals. In some examples, the antenna elements 410, 412, 414 can be coupled to (directly or indirectly) corresponding amplifiers, as further described below with respect to FIGS. 4B and 4C. The amplifiers can include, for example, low noise amplifiers (LNAs) in the receiving (Rx) direction or power amplifiers (PAs) in the transmitting (Tx) direction.

An antenna aperture 402 of the antenna lattice 406 can be an area through which power is radiated or received. A phased array antenna can synthesize a specified electric field (phase and amplitude) across the aperture 402. The antenna lattice 406 can define the antenna aperture 402 and can include the antenna elements 410, 412, 414 arranged in a particular configuration that is supported physically and/or electronically by a PCB.

Figure 4B:
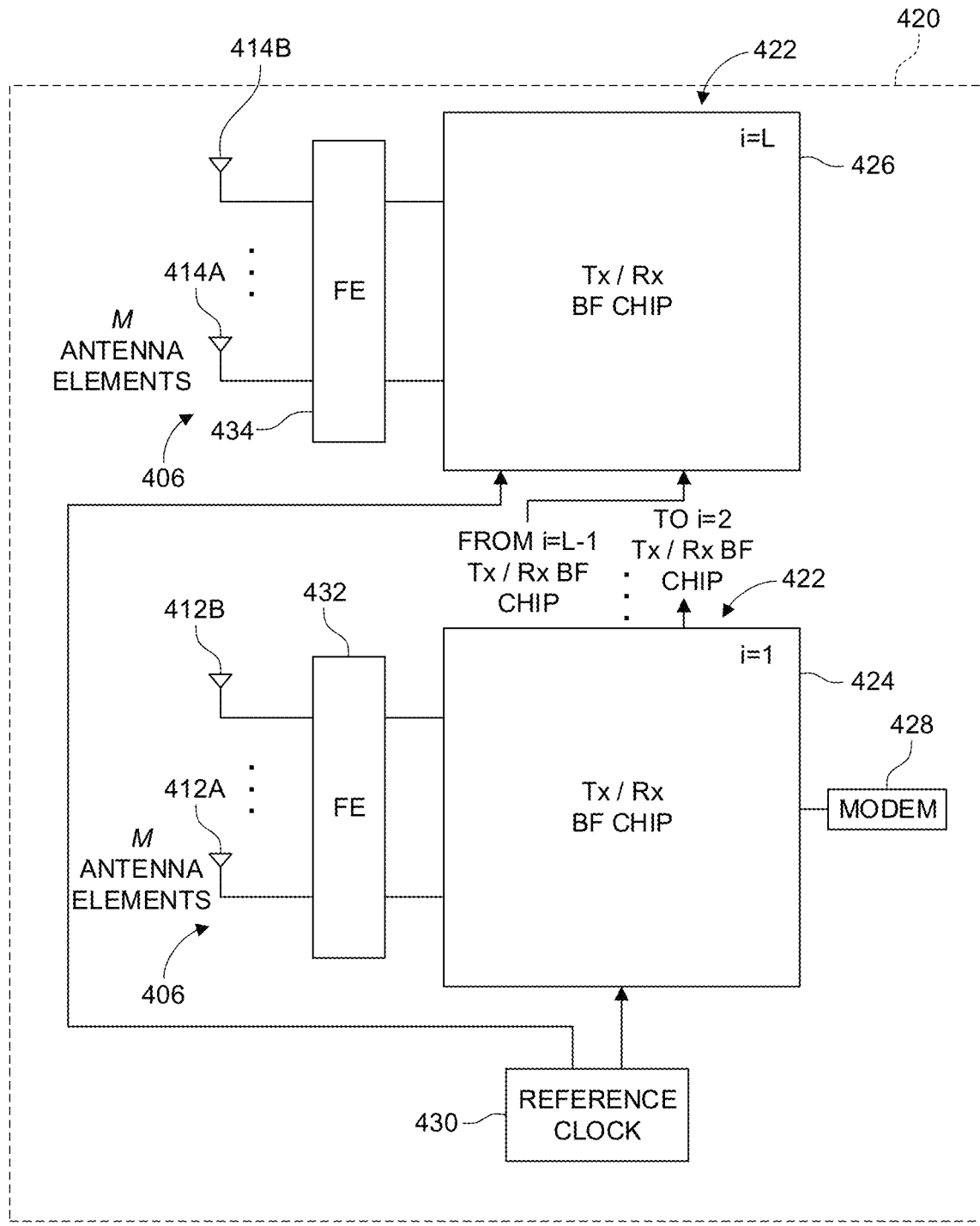
FIG. 4B is a diagram illustrating an example phased array antenna system, in accordance with some examples of the present disclosure.
Figure 4C:
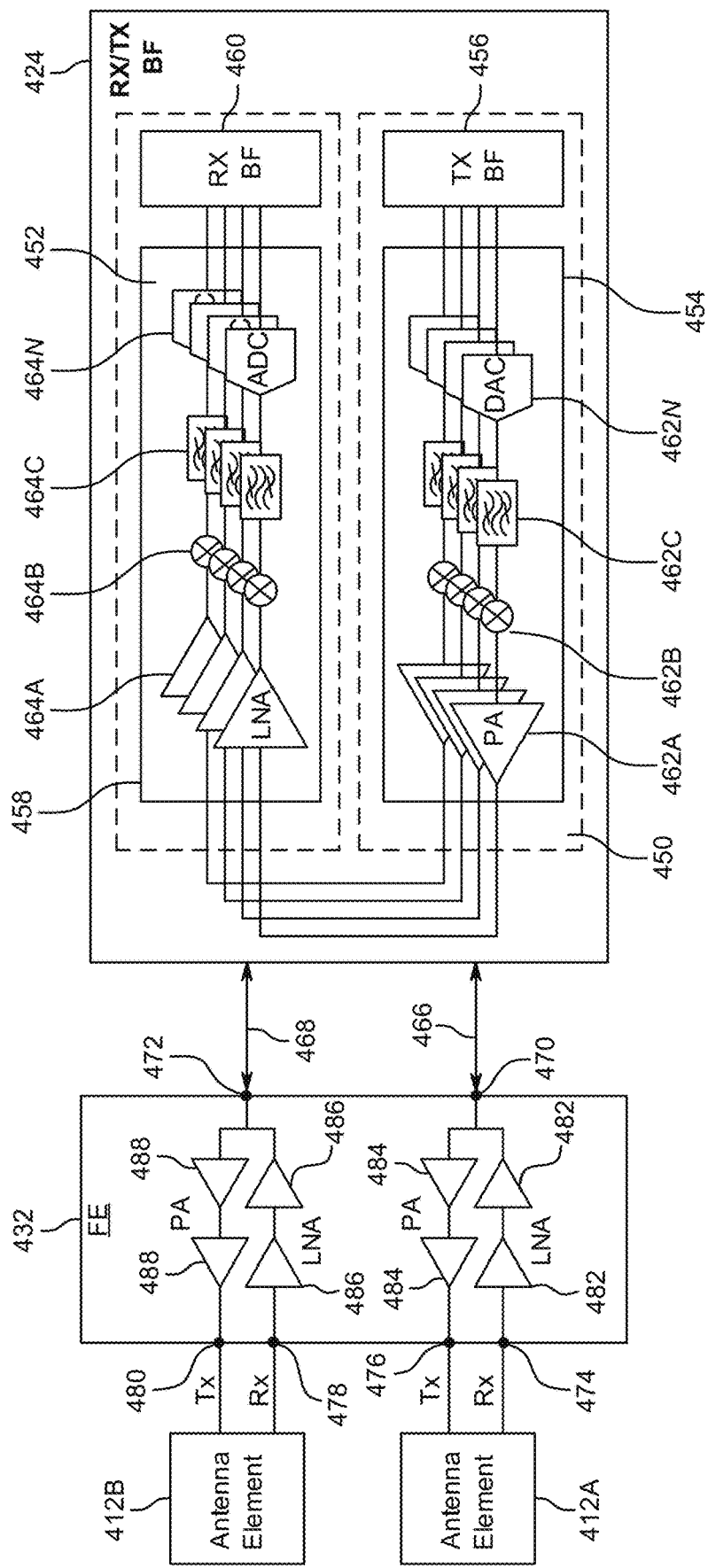
FIG. 4C is a diagram illustrating example components of a beamformer chip and a frontend that interfaces the beamformer chip with antenna elements, in accordance with some examples of the present disclosure.

In some cases, the antenna aperture 402 can be grouped into subsets of antenna elements 404A and 404B. Each subset 404A, 404B of antenna elements can include M number of antenna elements 412, 414, which can be associated with specific beamformer (BF) chips as shown in FIGS. 4B and 4C. The remaining antenna elements 410 in the antenna aperture 402 can be similarly associated with other beamformer chips (not shown).

FIG. 4B is a diagram illustrating an example phased array antenna system 420, in accordance with some examples. The phased array antenna system 420 can include an antenna lattice 406 including antenna elements 412, 414, and a beamformer lattice 422, which in this example includes beamformer (BF) chips 424, 426, for receiving signals from a modem 428 in the transmit (Tx) direction and sending signals to the modem 428 in the receive (Rx) direction. The antenna lattice 406 can be configured to transmit or receive a beam of radio frequency signals having a radiation pattern from or to the antenna aperture 402.

The BF chips 424, 426 in the beamformer lattice 422 can include an L number of BF chips. For example, BF chip 424 can include a BF chip i (i=1, where i=1 to L), and so forth, and BF chip 426 can include the Lth BF chip (i=L) of the BF chips in the beamformer lattice 422. Each BF chip of the beamformer lattice 422 electrically couples with a group of respective M number of antenna elements. In the illustrated example, BF chip 424 electrically couples with M antenna elements 412 and BF chip 426 electrically couples with M antenna elements 414. In the illustrated example, the BF chips in the beamformer lattice 422 are electrically coupled to each other in a daisy chain arrangement. However, other types of beamformers (e.g., analog, hybrid, etc.), beamforming techniques, configurations, coupling arrangements, etc., are within the scope of the present disclosure. For example, in other implementations, aspects of the disclosure can be implemented using analog beamforming or hybrid beamforming (e.g., implementing combined aspects of analog and digital beamforming). As another example, in other implementations, aspects of the disclosure can be implemented using beamformers having a different arrangement(s) and/or electrical coupling structure(s) such as, for example and without limitation, a multiplex feed network or a hierarchical network or H-network.

Each BF chip of the beamformer lattice 422 can include an integrated circuit (IC) chip or an IC chip package including a plurality of pins. In some cases, a first subset of the plurality of pins can be configured to communicate signals with a respective, electrically coupled BF chip(s) (if in a daisy chain configuration), and/or modem 428 in the case of BF chip 424. A second subset of the plurality of pins can be configured to transmit/receive signals with M antenna elements, and a third subset of the plurality of pins can be configured to receive a signal from a reference clock 430. The BF chips in the beamformer lattice 422 may also be referred to as transmit/receive (Tx/Rx) BF chips, Tx/Rx chips, transceivers, BF transceivers, and/or the like. As described above, the BF chips may be configured for Rx communication, Tx communication, or both.

In some cases, the BF chips 424, 426 in the beamformer lattice 422 can include amplifiers, phase shifters, mixers, filters, up samplers, down samplers, VGAs, and/or other electrical components. In the receiving direction (Rx), a beamformer function can include delaying signals arriving from each antenna element so the signals arrive to a combining network at the same time. In the transmitting direction (Tx), the beamformer function can include delaying the signal sent to each antenna element such that the signals arrive at the target location at the same time (or substantially the same time). This delay can be accomplished by using "true time delay" or a phase shift at a specific frequency. In some examples, each of the BF chips 424, 426 can be configured to operate in half duplex mode, where the BF chips 424, 426 switch between receive and transmit modes as opposed to full duplex mode where RF signals/waveforms can be received and transmitted simultaneously. In other examples, each of the BF chips 424, 426 can be configured to operate in full duplex mode, where RF signals/waveforms can be received and transmitted simultaneously.

The phased array antenna system 420 can include frontend (FE) components 432, 434 that interface with the BF chips 424, 426 and the antenna elements 412, 414. For example, the FE 432 can communicatively couple the BF chip 424 with M antenna elements 412, and the FE 434 can communicatively couple the BF chip 426 with M antenna elements 414. The FEs 432, 434 can include RF or millimeter wave (mmWave) frontend integrated circuits, modules, devices, and/or any other type of frontend package and/or component(s). In some cases, the FEs 432, 434 can include multiple-input, multiple-output FEs interfacing with multiple antenna elements and one or more BF chips.

The FEs 432, 434 can include various components, such as RF ports, BF ports, amplifiers (e.g., PAs, LNAs, VGAs, etc.), and the like. In some examples, in Rx mode, the FEs 432, 434 can provide a gain to RF contents of each Rx input, and low noise power to suppress the signal-to-noise ratio impacts of noise contributors downstream in the Rx chain/path. Moreover, in Tx mode, the FEs 432, 434 can provide gain to each Tx path and drive RF power into a corresponding antenna element.

FIG. 4C is a diagram illustrating example components of a BF chip 424 and a FE 432 that interfaces the BF chip 424 with antenna elements 412A, 412B. In this example, the BF chip 424 can include a transmit section 450 and a receive section 452, and the FE 432 can include RF ports 470, 472 for RF inputs/outputs to and from the BF chip 424, Rx port 474 for receive signals and Tx port 476 for transmit signals to and from antenna element 412A, and Rx port 478 for receive signals and Tx port 480 for transmit signals to and from antenna element 412B.

The transmit section 450 can include a transmit beamformer (Tx BF) 456 and one or more RF sections 454. The Tx BF 456 can include a number of components (e.g., digital and/or analog) such as, for example and without limitation, a VGA, a time delay filter, a filter, a gain control, one or more phase shifters, one or more up samplers, one or more IQ gain and phase compensators, and the like. Each RF section 454 can also include a number of components (e.g., digital and/or analog). In this example, each RF section 454 includes a power amplifier (PA) 462A, a mixer 462B, a filter 462C such as a low pass filter, and a digital-to-analog converter (DAC) 462N. The one or more RF sections 454 can be configured to ready the time delay and phase encoded digital signals for transmission. In some examples, the one or more RF sections 454 can include an RF section 454 for each signal path 466, 468 to each antenna element 412A, 412B.

The receive section 452 can include a receive beamformer (Rx BF) 460 and one or more RF sections 458. The Rx BF 460 can include a number of components such as, for example and without limitation, a VGA, a time delay filter, a filter, an adder, one or more phase shifters, one or more down samplers, one or more filters, one or more IQ compensators, one or more direct current offset compensators (DCOCs), and the like. Each RF section 458 can also include a number of components. In this example, each RF section 458 includes a low noise amplifier (LNA) 464A, a mixer 464B, a filter 464C such as a low pass filter, and an analog-to-digital converter (ADC) 464N. In some examples, the one or more RF sections 458 can include an RF section 458 for each signal path 466, 468 to each antenna element 412A, 412B.

The FE 432 can include one or more components 482 for processing Rx signals from the antenna element 412A and one or more components 484 for processing Tx signals to the antenna element 412A. The FE 432 can also include one or more components 486 for processing Rx signals from the antenna element 412B and one or more components 488 for processing Tx signals to the antenna element 412B. In FIG. 4C, the components 482 and 486 include LNAs to amplify respective signals from the antenna elements 412A, 412B without significantly degrading the signal-to-noise ratio of the signals, and the components 484 and 488 include PAs to amplify signals from the transmit section 456 to the antenna elements 412A, 412B. In some examples, the FE 432 can include other components such as, for example, VGAs and/or phase shifters (e.g., for Rx and/or Tx).

In some cases, the FE 432 can be communicatively coupled to one or more 90-degree hybrid couplers (not shown), which can be communicatively coupled to the antenna elements 412A, 412B. In some examples, a 90-degree hybrid coupler can be used for power splitting in the Rx direction and power combining in the Tx direction and/or to interface the FE 432 with a circularly polarized antenna element. However, other directional coupler mechanisms are within the scope of the present disclosure.

The BF chip 424 and FE 432 can process data signals, streams, or beams for transmission by the antenna elements 412A, 412B, and receive data signals, streams, or beams from antenna elements 412A, 412B. The BF chip 424 can also recover/reconstitute the original data signal in a signal received from antenna elements 412A, 412B and FE 432. Moreover, the BF chip 424 can strengthen signals in desired directions and suppress signals and noise in undesired directions.

For example, in transmit mode (e.g., the transmit direction), the one or more RF sections 454 of the transmit section 450 can process signals from the Tx BF 456 and output corresponding signals amplified by the PA 462A. Signals to the antenna element 412A can be routed through signal path 466 to RF port 470 of the FE 432, and signals to the antenna element 412B can be routed through signal path 468 to RF port 472 of the FE 432. The FE 432 can process an RF signal received from signal path 466 and output an amplified RF signal through Tx port 476. Antenna element 412A can receive the amplified RF signal and radiate the amplified RF signal. Similarly, the FE 432 can process an RF signal received from signal path 468 and output an amplified RF signal through Tx port 480. Antenna element 412B can receive the amplified RF signal and radiate the amplified RF signal.

In receive mode (e.g., the receive direction), FE 432 can receive RF signals from antenna elements 412A, 412B and process the RF signals using components 482 and 486. The FE 432 can receive RF signals from antenna element 412A via Rx port 474, and RF signals from antenna element 412B through Rx port 478. The components 482 and 486 can amplify respective RF signals from the antenna elements 412A, 412B without significantly degrading the signal-tonoise ratio of the RF signals. The components 482 can output RF signals from the antenna element 412A, which can be routed from RF port 470 of the FE 432 through the signal path 466 to the receive section 452 of the BF chip 424. Similarly, the components 486 can output RF signals from the antenna element 412B, which can be routed from RF port 472 of the FE 432 through the signal path 468 to the receive section 452 of the BF chip 424.

The one or more RF sections 458 of the receive section 452 of the BF chip 424 can process the received RF signals and output the processed signal to the Rx BF 460. In some examples, the processed signal can include a signal amplified by an LNA 464A of RF section 458. The Rx BF 460 can receive the signal and output a beamformed signal to a modem (e.g., modem 428).

In some examples, the transmit section 450 and the receive section 452 can support a same number and/or set of antenna elements. In other examples, the transmit section 450 and the receive section 452 can support different numbers and/or sets of antenna elements. Moreover, while FIG. 4C illustrates a single FE interfacing with the BF chip 424, it should be noted that a BF chip can interface with multiple FEs. The configuration of a single FE interfacing with a BF chip in FIG. 4C is merely an illustrative example provided for explanation purposes. Also, while the FE 432 is shown in FIG. 4C with 2 RF inputs (e.g., RF ports 474 and 478) and 2 RF outputs (e.g., Tx ports 476 and 480) supporting 2 antenna elements (e.g., antenna elements 412A and 412B), it should be noted that, in other examples, the FE 432 can include more or less RF inputs/outputs and can support more or less antenna elements than shown in FIG. 4C. For example, in some cases, the FE 432 can include 4 RF inputs and 4 RF outputs and can support more than 2 antenna elements.

While the BF chip 424 and the FE 432 are shown to include certain elements and components, one of ordinary skill will appreciate that the BF chip 424 and the FE 432 can include more or fewer elements and components than those shown in FIG. 4C. For example, in some cases, the BF chip 424 and/or the FE 432 can be coupled to, reside on, and/or implemented by, a printed circuit board (PCB) of the phased array antenna system and/or any number of discrete parts on a PCB. The elements and components of the BF chip 424 and the FE 432 shown in FIG. 4C are merely illustrative examples provided for explanation purposes. Moreover, the example phased array antenna system 420 in FIG. 4B is merely an example implementation provided for explanation purposes. One of skill in the art will recognize that, in other implementations, the phased array antenna system 420 can include more or less of the same and/or different components than those shown in FIG. 4B. For example, in other implementations, the phased array antenna system 420 can implement other beamformers (e.g., analog, digital, hybrid), a different number and/or arrangement of beamformers and/or FEs, and/or any other type and/or configuration of beamformers and/or FEs.

FIG. 5 is a schematic diagram illustrating an example RFIO network 500. The RFIO network 500 can implement a matching network. In some cases, the RFIO network 500 can be part of and/or implemented by a phased array antenna system (e.g., phased array antenna system 420). In other cases, the RFIO network 500 can be part of and/or implemented by a computing device such as, for example, a smartphone, a tablet computer, a laptop computer, a smart wearable device, etc.

In some examples, the matching network can include a wideband compact matching network for low-cost time division duplexing (TDD). For example, the matching network can include a wideband compact matching network associated with a low cost TDD receive (Rx) and transmit (Tx) frontend of a phased array antenna system. In some examples, the RFIO network 500 can be part of and/or implemented by an FE (e.g., FE 432 or FE 434). In other examples, the RFIO network 500 can be separate from and/or coupled to an FE (e.g., FE 432 or FE 434). In some cases, the RFIO network 500 can include a tunable matching network that uses one or more switches in series with a bias resistance. Accordingly, the RFIO network 500 can be implemented without more expensive RF switches and/or can be compatible with less expensive circuit components/technologies.

The RFIO network 500 can enable switching between Rx and Tx circuitry and/or operations. Moreover, the RFIO network 500 can switch between Rx and Tx circuitry and/or operations without more expensive and/or higher performance switches, such as RF switches for example. As previously mentioned, in some examples, the RFIO network 500 can perform TDD. In other examples, the RFIO network 500 can perform power splitting between separate systems with different frequency operation. For example, the RFIO network 500 can be implemented by a FE and/or other circuit of a mobile device to select a particular antenna, from a set of antennas, to receive an input signal.

As shown in FIG. 5, the RFIO network 500 can include a balun 504 that connects the Tx and Rx paths of the RFIO network 500. The Rx path can include a path to the Rx section of the RFIO network 500, which can include LNA 510A and LNA 510B. The Tx path can include a path to the Tx section of the RFIO network 500, which can include PA 520A and PA 520B. In some cases, the LNA 510A and LNA 510B can include differential LNAs. In some cases, the PA 520A and PA 520B can include differential or pseudo differential PAs.

In some cases, the balun 504 can include a 3 turn balun. In some examples, the balun 504 can include a turn connected to LNA 510A and LNA 510B (e.g., the Rx path), a turn connected to PA 520A and 520B (e.g., the Tx path), and a turn connected to an RFIO input terminal 502 and to a mode control terminal 508 for mode control signals to the RFIO network 500. In some examples, the mode control signals can open and close switches in the RFIO network 500, as further described herein.

In some examples, the balun 504 can include an inductor 506A that is center-tapped to ground, an inductor 506B coupled to the RFIO input terminal 502 and to the mode control terminal 508, and an inductor 506C center-tapped to a power supply path (e.g., VCC path) to VCC 540A and VCC 540B. On the Rx side, the RFIO network 500 can include Rx switch 512A and Rx switch 512B. Rx switch 512A and Rx switch 512B can each be coupled to a respective capacitor 514 and a respective resistor 516. On the Tx side, the RFIO network 500 can include Tx switches 522A through 522H, resistors 524A through 524H, resistors 526A through 526D, capacitors 528, transistors 530, transistors 532, and inductors 534. In some cases, the resistors 524A through 522H can include R or 1R resistors with R or 1R resistance values, and resistors 526A through 526D can include nR resistors with nR resistance values, where n is a number greater than 1.

In one illustrative example, the bias resistance and/or the R resistance in the RFIO network 500 can be approximately 800 Ohms, making the on resistance of one or more of the switches flexible. The flexible on resistance can enable the RFIO network 500 (and/or associated techniques and/or components) to be implemented on low cost complementary metal-oxide-semiconductor (CMOS) technology or BiCMOS technology. In some cases, the transistors 532 can a current mirror. In some examples, the transistors 530 and/or the transistors 532 can include bipolar junction transistors (BJT). In other cases, the transistors 530 and/or the transistors 532 can include other types of transistors.

In Tx mode, the Rx switches 512A, 512B and the Rx-VCC switches 542A, 542B can be open/off, and the Tx switches 522A through 522H can be closed/on. As a result, in Tx mode, the power delivered to the RFIO network 500 can be transferred to PA 520A and PA 520B on the Tx side. In Rx mode, the Rx switches 512A, 512B and the Rx-VCC switches 542A, 542B can be closed/on, and Tx switches 522A through 522G can be open/off. As a result, in Rx mode, the power delivered to the RFIO network 500 can be transferred to LNA 510A and LNA 510B on the Rx side. In some examples, the Rx switches 512A, 512B, the Rx-VCC switches 542A, 542B, and the Tx switches 522A through 522H can be opened and closed by one or more mode control signals.

Moreover, the Tx switches 522A through 522H can allow the matching network of the RFIO network 500 to switch between RX and TX modes. The Tx switches 522A through 522H can allow the matching network of the RFIO network 500 to switch between RX and TX modes without using and/or requiring more expensive RF switches, such as high frequency RF switches.

In some cases, one or more (or all) of the Tx switches 522A through 522H can be in series with the bias resistance. In some examples, Tx switch 522A and Tx switch 522B can be in series with resistor 524A, resistor 524B, and/or resistor 526A; and Tx switch 522C and Tx switch 522D can be in series with resistor 524C, resistor 524D, and/or resistor 526B. Similarly, Tx switch 522E and Tx switch 522F can be in series with resistor 524E, resistor 524F, and/or resistor 526C; and Tx switch 522G and Tx switch 522H can be in series with resistor 524G, resistor 524H, and/or resistor 526D.

In some cases, the Rx switches 512A, 512B and the Rx-VCC switches 542A, 542B can be in series with a respective resistor. For example, the Rx switches 512A and 512B can be in series with a respective resistor 516, and the Rx-VCC switches 542A, 542B can be in series with a respective resistor 544. This, among other things as described herein, can ensure that in both Rx and Tx mode, the RFIO network 500 and the techniques disclosed herein can operate without the need for a low on resistance switch.

As shown in FIG. 5, the RFIO network 500 can include a 1 input 4 output wideband matching network that is implemented with a balun (e.g., balun 504) and a small number of lower quality/cost switches that are in series with resistors. In some cases, such design can allow the RFIO network 500 to implement lower cost components, and can provide a lower cost FE in a phased array antenna system and/or a computing device.

FIG. 6 is a diagram illustrating an example circuit layout 600 of the RFIO network 500. The circuit layout 600 illustrates an example layout design of the RFIO network 500, including patterns of metal, oxide, semiconductor, and/or any other layers that make up the components of the RFIO network 500.

In FIG. 6, the circuit layout 600 shows an illustrative example placement/arrangement of the RFIO input terminal 502, the LNAs 510A and 510B, the PAs 520A and 520B, and the VCCs 540A and 540B. The circuit layout 600 also shows patterns of material layers in the RFIO network 500.

FIG. 7 is a graph illustrating an example frequency response 700 of the RFIO network 500. As shown in this example, in TX mode, S11 is well matched at 14-14.5 GHz and there is approximately a 5.5 dB loss from input to each PA (e.g., PA 520A and PA 520B). In some cases, 3 dB of this loss can be due to power splitting between the PAs 520A and 520B. In the Rx mode, S11 is well matched between 11 GHz to 13 GHz and there is approximately a 5.5 dB loss from one LNA (e.g., LNA 510A, LNA 510B) to the RFIO input terminal 502.

In some examples, one or more processes, such as digital signaling and/or data processing operations, may be performed by one or more computing devices or apparatuses. In some examples, the phased array antenna systems, FEs, RFIO circuits, and/or other components described herein can be implemented by a user terminal or SAT shown in FIG. 1A and/or one or more computing devices with the computing device architecture 800 shown in FIG. 8. In some cases, such a computing device or apparatus may include a processor, microprocessor, microcomputer, or other component of a device that is configured to carry out one or more operations described herein. In some examples, such computing device or apparatus may include one or more antennas for sending and receiving RF signals. In some examples, such computing device or apparatus may include an antenna and a modem for sending, receiving, modulating, and demodulating RF signals.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

In some cases, one or more operations described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which any operations are described is not intended to be construed as a limitation, and any number of the described operations can be combined in any order and/or in parallel to implement the processes.

FIG. 8 illustrates an example computing device architecture 800 of an example computing device which can implement various techniques and/or operations described herein. For example, the computing device architecture 800 can be used to implement at least some portions of the SATs 102, the SAGs 104, the user terminals 112 and/or the user network devices 114 shown in FIG. 1A, and perform at least some of the operations described herein. The components of the computing device architecture 800 are shown in electrical communication with each other using a connection 805, such as a bus. The example computing device architecture 800 includes a processing unit (CPU or processor) 810 and a computing device connection 805 that couples various computing device components including the computing device memory 815, such as read only memory (ROM) 820 and random access memory (RAM) 825, to the processor 810.

The computing device architecture 800 can include a cache of high-speed memory connected directly with, in close proximity to, or integrated as part of the processor 810. The computing device architecture 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other computing device memory 815 may be available for use as well. The memory 815 can include multiple different types of memory with different performance characteristics. The processor 810 can include any general purpose processor and a hardware or software service stored in storage device 830 and configured to control the processor 810 as well as a special-purpose processor where software instructions are incorporated into the processor design. The processor 810 may be a self-contained system, containing multiple cores or processors, a bus, memory controller, cache, etc. A multi-core processor may be symmetric or asymmetric.

To enable user interaction with the computing device architecture 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art, such as a display, projector, television, speaker device. In some instances, multimodal computing devices can enable a user to provide multiple types of input to communicate with the computing device architecture 800. The communication interface 840 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. The storage device 830 can include software, code, firmware, etc., for controlling the processor 810. Other hardware or software modules are contemplated. The storage device 830 can be connected to the computing device connection 805. In one aspect, a hardware module that performs a particular function can include the software component stored in a computer-readable medium in connection with the necessary hardware components, such as the processor 810, connection 805, output device 835, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using signals and/or computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication devices, or integrated circuit devices having multiple uses including application in wireless communications and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: A radio frequency input/output (RFIO) circuit comprising: a receive (Rx) path comprising a first low noise amplifier (LNA) and a second LNA, a first set of switches, a first set of resistors, and a first set of capacitors, wherein a first switch of the first set of switches is in series with a first capacitor of the first set of capacitors and a first resistor of the first set of resistors, and wherein a second switch of the first set of switches is in series with a second capacitor of the first set of capacitors and a second resistor of the first set of resistors; a transmit (Tx) path comprising a first power amplifier (PA) and a second PA, wherein the first PA comprises a second set of switches coupled to a second set of resistors and a third set of switches coupled to a third set of resistors, wherein the second PA comprises a fourth set of switches coupled to a fourth set of resistors and a fifth set of switches coupled to a fifth set of resistors, and wherein each switch of the second set of switches is in series with one or more of the second set of resistors, each switch of the third set of switches is in series with one or more of the third set of resistors, each switch of the fourth set of switches is in series with one or more of the fourth set of resistors, and each switch of the fifth set of switches is in series with one or more of the fifth set of resistors; and a balun that couples the Rx path and the Tx path to an RFIO terminal.

Aspect 2: The RFIO circuit of Aspect 1, wherein the balun comprises a first turn coupled to the RFIO terminal, a second turn connected to the Rx path, and a third turn connected to the Tx path.

Aspect 3: The RFIO circuit of any of Aspects 1 to 2, wherein the balun comprises a first inductor coupled to the RFIO terminal, a second inductor connected to the Rx path, and a third inductor connected to the Tx path.

Aspect 4: The RFIO circuit of Aspect 3, wherein the first inductor is further coupled to an RFIO mode control terminal configured to receive mode control signals, wherein the second inductor is center-tapped to a power supply path, and wherein the third inductor is center-tapped to ground.

Aspect 5: The RFIO circuit of Aspect 4, wherein the power supply path comprises a first VCC terminal and a second VCC terminal, wherein the first VCC terminal is coupled to a third switch that is in series with a third resistor, and wherein the second VCC is coupled to a fourth switch that is in series with a fourth resistor.

Aspect 6: The RFIO circuit of Aspect 5, wherein the RFIO circuit is configured to transfer power to the first PA and the second PA when operating in Tx mode, and wherein the RFIO circuit operates in Tx mode in response to a control signal configured to: close the second set of switches, the third set of switches, the fourth set of switches, and the fifth set of switches associated with the Tx path; and open the first set of switches associated with the Rx path, the third switch, and the fourth switch.

Aspect 7: The RFIO circuit of any of Aspects 5 to 6, wherein the RFIO circuit is configured to transfer power to the first LNA and the second LNA when operating in Rx mode, and wherein the RFIO circuit operates in Rx mode in response to a control signal configured to: open the second set of switches, the third set of switches, the fourth set of switches, and the fifth set of switches associated with the Tx path; and close the first set of switches associated with the Rx path, the third switch, and the fourth switch.

Aspect 8: The RFIO circuit of any of Aspects 4 to 7, wherein the first inductor is further connected to ground and a third capacitor, and wherein the RFIO circuit comprises a tunable matching network.

Aspect 9: The RFIO circuit of any of Aspects 4 to 8, wherein the first LNA and the second LNA comprise differential LNAs, and wherein the first PA and the second PA comprise pseudo-differential PAs.

Aspect 10: The RFIO circuit of any of Aspects 1 to 9, wherein the RFIO circuit comprises at least a portion of a frontend circuit of a phased array antenna.

Aspect 11: The RFIO circuit of any of Aspects 1 to 10, wherein the RFIO circuit comprises a one input, four output wideband matching network.

Aspect 12: A system comprising: a plurality of antenna elements; and one or more frontend circuits communicatively coupled with the plurality of antenna elements, wherein each frontend circuit is communicatively coupled with a respective set of antenna elements from the plurality of antenna elements, and wherein each frontend circuit comprises a radio frequency input/output (RFIO) circuit, the RFIO circuit comprising: a receive (Rx) path comprising a first low noise amplifier (LNA) and a second LNA, a first set of switches, a first set of resistors, and a first set of capacitors, wherein a first switch of the first set of switches is in series with a first capacitor of the first set of capacitors and a first resistor of the first set of resistors, and wherein a second switch of the first set of switches is in series with a second capacitor of the first set of capacitors and a second resistor of the first set of resistors; a transmit (Tx) path comprising a first power amplifier (PA) and a second PA, wherein the first PA comprises a second set of switches coupled to a second set of resistors and a third set of switches coupled to a third set of resistors, wherein the second PA comprises a fourth set of switches coupled to a fourth set of resistors and a fifth set of switches coupled to a fifth set of resistors, and wherein each switch of the second set of switches is in series with one or more of the second set of resistors, each switch of the third set of switches is in series with one or more of the third set of resistors, each switch of the fourth set of switches is in series with one or more of the fourth set of resistors, and each switch of the fifth set of switches is in series with one or more of the fifth set of resistors; and a balun that couples the Rx path and the Tx path to an RFIO terminal.

Aspect 13: The system of Aspect 12, wherein the balun comprises a first turn connected to the RFIO terminal, a second turn connected to the Rx path, and a third turn coupled to the Tx path.

Aspect 14: The system of any of Aspects 12 to 13, wherein the balun comprises a first inductor connected to the RFIO terminal, a second inductor connected to the Rx path, and a third inductor connected to the Tx path.

Aspect 15: The system of Aspect 14, wherein the first inductor is further coupled to an RFIO mode control terminal configured to receive mode control signals, wherein the second inductor is center-tapped to a power supply path, and wherein the third inductor is center-tapped to ground.

Aspect 16: The system of Aspect 15, wherein the power supply path comprises a first VCC terminal and a second VCC terminal, wherein the first VCC terminal is coupled to a third switch that is in series with a third resistor, and wherein the second VCC is coupled to a fourth switch that is in series with a fourth resistor.

Aspect 17: The system of Aspect 16, wherein the RFIO circuit is configured to transfer power to the first PA and the second PA when operating in Tx mode, and wherein the RFIO circuit operates in Tx mode in response to a control signal configured to: close the second set of switches, the third set of switches, the fourth set of switches, and the fifth set of switches associated with the Tx path; and open the first set of switches associated with the Rx path, the third switch, and the fourth switch.

Aspect 18: The system of any of Aspects 16 to 17, wherein the RFIO circuit is configured to transfer power to the first LNA and the second LNA when operating in Rx mode, and wherein the RFIO circuit operates in Rx mode in response to a control signal configured to: open the second set of switches, the third set of switches, the fourth set of switches, and the fifth set of switches associated with the Tx path; and close the first set of switches associated with the Rx path, the third switch, and the fourth switch.

Aspect 19: The system of any of Aspects 15 to 18, wherein the first inductor is further coupled to ground and a third capacitor, and wherein the RFIO circuit comprises a tunable matching network.

Aspect 20: The system of any of Aspects 12 to 19, wherein the first LNA and the second LNA comprise differential LNAs, and wherein the first PA and the second PA comprise pseudo-differential PAs.

Aspect 21: The system of any of Aspects 12 to 20, wherein the RFIO circuit comprises a one input, four output wideband matching network.

Aspect 22: The system of any of Aspects 12 to 21, wherein the system comprises a phased array antenna.

What is claimed is:

1. A radio frequency input/output (RFIO) circuit comprising:
 a receive (Rx) path comprising a first low noise amplifier (LNA) and a second LNA, a first set of switches, a first set of resistors, and a first set of capacitors, wherein a first switch of the first set of switches is in series with a first capacitor of the first set of capacitors and a first resistor of the first set of resistors, and wherein a second switch of the first set of switches is in series with a second capacitor of the first set of capacitors and a second resistor of the first set of resistors;
 a transmit (Tx) path comprising a first power amplifier (PA) and a second PA, wherein the first PA comprises a second set of switches coupled to a second set of resistors and a third set of switches coupled to a third set of resistors, wherein the second PA comprises a fourth set of switches coupled to a fourth set of resistors and a fifth set of switches coupled to a fifth set of resistors, and wherein each switch of the second set of switches is in series with one or more of the second set of resistors, each switch of the third set of switches is in series with one or more of the third set of resistors, each switch of the fourth set of switches is in series with one or more of the fourth set of resistors, and each switch of the fifth set of switches is in series with one or more of the fifth set of resistors; and
 a balun that couples the Rx path and the Tx path to an RFIO terminal.

2. The RFIO circuit of claim 1, wherein the balun comprises a first turn connected to the RFIO terminal, a second turn connected to the Rx path, and a third turn connected to the Tx path.

3. The RFIO circuit of claim 1, wherein the balun comprises a first inductor coupled to the RFIO terminal, a second inductor connected to the Rx path, and a third inductor connected to the Tx path.

4. The RFIO circuit of claim 3, wherein the first inductor is further connected to an RFIO mode control terminal configured to receive mode control signals, wherein the second inductor is center-tapped to a power supply path, and wherein the third inductor is center-tapped to ground.

5. The RFIO circuit of claim 4, wherein the power supply path comprises a first VCC terminal and a second VCC terminal, wherein the first VCC terminal is coupled to a third switch that is in series with a third resistor, and wherein the second VCC is coupled to a fourth switch that is in series with a fourth resistor.

6. The RFIO circuit of claim 5, wherein the RFIO circuit is configured to transfer power to the first PA and the second PA when operating in Tx mode, and wherein the RFIO circuit operates in Tx mode in response to a control signal configured to:
 close the second set of switches, the third set of switches, the fourth set of switches, and the fifth set of switches associated with the Tx path; and
 open the first set of switches associated with the Rx path, the third switch, and the fourth switch.

7. The RFIO circuit of claim 5, wherein the RFIO circuit is configured to transfer power to the first LNA and the second LNA when operating in Rx mode, and wherein the RFIO circuit operates in Rx mode in response to a control signal configured to:
 open the second set of switches, the third set of switches, the fourth set of switches, and the fifth set of switches associated with the Tx path; and
 close the first set of switches associated with the Rx path, the third switch, and the fourth switch.

8. The RFIO circuit of claim 4, wherein the first inductor is further coupled to ground and a third capacitor, and wherein the RFIO circuit comprises a tunable matching network.

9. The RFIO circuit of claim 1, wherein the first LNA and the second LNA comprise differential LNAs, and wherein the first PA and the second PA comprise pseudo-differential PAs.

10. The RFIO circuit of claim 1, wherein the RFIO circuit comprises at least a portion of a frontend circuit of a phased array antenna.

11. The RFIO circuit of claim 1, wherein the RFIO circuit comprises a one input, four output wideband matching network.

12. A system comprising:
 a plurality of antenna elements; and
 one or more frontend circuits communicatively coupled with the plurality of antenna elements, wherein each frontend circuit is communicatively coupled with a respective set of antenna elements from the plurality of antenna elements, and wherein each frontend circuit comprises a radio frequency input/output (RFIO) circuit, the RFIO circuit comprising:
  a receive (Rx) path comprising a first low noise amplifier (LNA) and a second LNA, a first set of switches, a first set of resistors, and a first set of capacitors, wherein a first switch of the first set of switches is in series with a first capacitor of the first set of capacitors and a first resistor of the first set of resistors, and wherein a second switch of the first set of switches is in series with a second capacitor of the first set of capacitors and a second resistor of the first set of resistors;

a transmit (Tx) path comprising a first power amplifier (PA) and a second PA, wherein the first PA comprises a second set of switches coupled to a second set of resistors and a third set of switches coupled to a third set of resistors, wherein the second PA comprises a fourth set of switches coupled to a fourth set of resistors and a fifth set of switches coupled to a fifth set of resistors, and wherein each switch of the second set of switches is in series with one or more of the second set of resistors, each switch of the third set of switches is in series with one or more of the third set of resistors, each switch of the fourth set of switches is in series with one or more of the fourth set of resistors, and each switch of the fifth set of switches is in series with one or more of the fifth set of resistors; and a balun that couples the Rx path and the Tx path to an RFIO terminal.

13. The system of claim 12, wherein the balun comprises a first turn connected to the RFIO terminal, a second turn connected to the Rx path, and a third turn coupled to the Tx path.

14. The system of claim 12, wherein the balun comprises a first inductor coupled to the RFIO terminal, a second inductor connected to the Rx path, and a third inductor connected to the Tx path.

15. The system of claim 14, wherein the first inductor is further coupled to an RFIO mode control terminal configured to receive mode control signals, wherein the second inductor is center-tapped to a power supply path, and wherein the third inductor is center-tapped to ground.

16. The system of claim 15, wherein the power supply path comprises a first VCC terminal and a second VCC terminal, wherein the first VCC terminal is coupled to a third switch that is in series with a third resistor, and wherein the second VCC is coupled to a fourth switch that is in series with a fourth resistor.

17. The system of claim 16, wherein the RFIO circuit is configured to transfer power to the first PA and the second PA when operating in Tx mode, and wherein the RFIO circuit operates in Tx mode in response to a control signal configured to:
close the second set of switches, the third set of switches, the fourth set of switches, and the fifth set of switches associated with the Tx path; and
open the first set of switches associated with the Rx path, the third switch, and the fourth switch.

18. The system of claim 16, wherein the RFIO circuit is configured to transfer power to the first LNA and the second LNA when operating in Rx mode, and wherein the RFIO circuit operates in Rx mode in response to a control signal configured to:
open the second set of switches, the third set of switches, the fourth set of switches, and the fifth set of switches associated with the Tx path; and
close the first set of switches associated with the Rx path, the third switch, and the fourth switch.

19. The system of claim 15, wherein the first inductor is further coupled to ground and a third capacitor, and wherein the RFIO circuit comprises a tunable matching network.

20. The system of claim 12, wherein the first LNA and the second LNA comprise differential LNAs, and wherein the first PA and the second PA comprise pseudo-differential PAs.

* * * * *